US008212879B2

(12) United States Patent
Nagata et al.

(10) Patent No.: US 8,212,879 B2
(45) Date of Patent: Jul. 3, 2012

(54) IMAGE STABILIZATION CONTROL CIRCUIT FOR IMAGING APPARATUS

(75) Inventors: Yasunori Nagata, Gifu (JP); Tomofumi Watanabe, Gifu (JP); Hideki Hirayama, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 726 days.

(21) Appl. No.: 12/335,179

(22) Filed: Dec. 15, 2008

(65) Prior Publication Data

US 2009/0153679 A1 Jun. 18, 2009

(30) Foreign Application Priority Data

Dec. 14, 2007 (JP) ................. 2007-322895

(51) Int. Cl.
*H04N 5/228* (2006.01)
(52) U.S. Cl. ................... 348/208.4
(58) Field of Classification Search ............... 348/208.1, 348/208.2, 208.4, 208.7, 208.9, 208.99; 396/55, 396/63; 382/107
See application file for complete search history.

(56) References Cited

U.S. PATENT DOCUMENTS

| | | | | |
|---|---|---|---|---|
| 5,682,556 A * | 10/1997 | Iwane et al. | .................. | 396/55 |
| 5,768,016 A | 6/1998 | Kanbara | | |
| 6,987,529 B1 * | 1/2006 | Ito | .............................. | 348/208.2 |
| 7,596,307 B2 * | 9/2009 | Tomita et al. | ............ | 348/208.99 |
| 7,885,523 B2 * | 2/2011 | Ohno et al. | .............. | 348/208.99 |

FOREIGN PATENT DOCUMENTS

| | | |
|---|---|---|
| JP | 62-168258 A | 7/1987 |
| JP | 8-43872 A | 2/1996 |
| JP | 10-150597 A | 6/1998 |
| JP | 10-213832 A | 8/1998 |
| JP | 2002-110925 A | 4/2002 |
| JP | 2003-316751 A | 11/2003 |

OTHER PUBLICATIONS

Notice of Grounds for Rejection for Japanese Patent Application No. 2007-322895, mailed Feb. 14, 2012, with English translation.

* cited by examiner

*Primary Examiner* — Aung S Moe
(74) *Attorney, Agent, or Firm* — Cantor Colburn LLP

(57) ABSTRACT

An internal CPU, a vibration control equalizer for processing an output signal of a vibration detector for detecting vibration of an imaging apparatus and calculating a vibration signal for determining a driving amount for an optical component on the basis of vibration of the imaging apparatus, a position control equalizer for calculating a position signal for determining a driving amount for the optical component on the basis of position of the optical component, and a control switching section for switching between the internal CPU and an external control circuit for the imaging apparatus for control of the vibration control equalizer and the position control equalizer.

4 Claims, 3 Drawing Sheets

IMAGE STABILIZATION CONTROL CIRCUIT FOR IMAGING APPARATUS

CROSS-REFERENCE TO RELATED APPLICATION

The entire disclosure of Japanese Patent Application No. 2007-322895 including specification, claims, drawings and abstract is incorporated herein by reference in its entirety.

BACKGROUND OF THE INVENTION

1. Field of the Invention

The present invention relates to an image stabilization control circuit embedded in an imaging apparatus.

2. Description of the Related Art

In recent years, imaging apparatuses, such as digital still cameras and digital video cameras, have realized high image quality through increases in the number of pixels of their built-in image sensors. On the other hand, as another method for imaging apparatuses to achieve higher image quality, it is desirable for an imaging apparatus to provide an anti-shake function to prevent shaking of a subject caused by shaking of a hand holding the imaging apparatus.

More specifically, an imaging apparatus is provided with a detection sensor, such as a gyro sensor, to prevent shaking of a subject by driving an optical component, such as a lens or an image sensor, in accordance with an angular velocity component created by vibration of the imaging apparatus. As a result, even if the imaging apparatus vibrates, a vibration component is not reflected in an obtained picture signal so that a picture signal having high image quality without blurring can be obtained.

FIG. 3 shows a block diagram of a conventional image stabilization control circuit 100 used for realizing an anti-shake function. The image stabilization control circuit 100 is provided in the imaging apparatus and operates in accordance with control of a main control circuit (not shown) provided in the imaging apparatus. The image stabilization control circuit 100 is connected to a position detector 102, a lens driver 104, and a vibration detector 106.

The position detector 102 detects the position of a lens used in the imaging apparatus. The position detector 102 can be implemented with a Hall device to generate an induced current according to the absolute position of the lens and output a voltage signal. The lens driver 104 can be implemented with a voice coil motor. The image stabilization control circuit 100 controls the position of a moving coil of the voice coil motor, namely, the position of the lens, by adjusting the voltage value supplied to the lens driver 104. The lens driver 104 drives the lens at a vertical in-plane with respect to the optical axis of the imaging apparatus. The vibration detector 106 detects vibration of the imaging apparatus and outputs the result to the image stabilization control circuit 100. The vibration detector 106 can be implemented with a gyro sensor. An angular velocity signal is generated according to the vibration that was applied to the imaging apparatus and output to the image stabilization control circuit 100.

It is preferable to configure the position sensor 102, the lens driver 104, and the vibration detector 106 each from at least two devices. For example, multiple devices are provided corresponding to a horizontal component and a vertical component in a plane perpendicular to the optical axis of the imaging apparatus for detecting lens position, moving the lens, and detecting vibration of the imaging apparatus.

Next, the image stabilization control circuit 100 will be described in detail. The image stabilization control circuit 100 includes a servo circuit 10, a lens driver circuit 12, an analog-to-digital converter (ADC) 14, a CPU 16, and a digital-to-analog converter (DAC) 18.

The servo circuit 10 generates a signal for controlling the lens driver 104 in accordance with a voltage signal output from the position detector 102. The servo circuit 10 is configured to include an analog filter circuit, which may include externally connected resistors and capacitors, and generates a signal to control the lens driver 104 so that the optical axis of the lens and the center of the image sensor provided in the imaging apparatus coincide. The lens driver circuit 12 generates a lens driving signal to drive the lens driver 104 on the basis of the signal output from the servo circuit 10.

The ADC 14 converts the analog angular velocity signal that is output by the vibration detector 106 into a digital signal. The CPU 16 generates an angular signal indicating a movement amount of the imaging apparatus on the basis of the digital angular velocity signal. The CPU 16 is connected to memory (not shown) and performs processing for generating the angular signal on the basis of software stored in the memory. The DAC 18 converts the digital angular signal generated by the CPU 16 into an analog signal.

Here, the servo circuit 10 generates a lens driving signal to drive the lens driver 104 in accordance with a signal, in which the analog angular signal output by the DAC 18 and the voltage signal output from the position detector 102 are added. Namely, to prevent subject shaking due to hand shake, shaking of the subject image on the image sensor is suppressed by varying the position of the lens on the basis of the angular signal indicating the movement amount of the imaging apparatus. Thus, shaking of the subject image due to hand shake is suppressed so that a picture signal having high image quality can be obtained.

To improve the processing speed of the image stabilization control circuit, it is desirable to replace the servo circuit, lens driver, and vibration detection signal processing circuit with logic circuits capable of digital processing. Furthermore, since the image stabilization control circuit is to be embedded in an image sensor or a lens module for an image sensor, such as of a digital camera, miniaturization as much as possible is necessary also when converting to logic circuits.

Furthermore, in general, a image stabilization control circuit converted to logic circuitry is configured to independently perform positioning control, such as of a lens, and vibration control. On the other hand, a main control device (main CPU) for controlling the overall apparatus and performing image processing is often embedded in the imaging apparatus, such as a digital camera, and there are also instances where it is necessary for the logic circuitry of the image stabilization control circuit to be directly controllable from an external main control device.

SUMMARY OF THE INVENTION

One aspect of the present invention is a image stabilization control circuit for reducing influence of vibration on image pickup by driving an optical component of an imaging apparatus according to the vibration. The image stabilization control circuit comprises a vibration control equalizer for processing an output signal of a vibration detector for detecting vibration of the imaging apparatus and generating a vibration signal indicating a movement amount of the imaging apparatus on the basis of vibration of the imaging apparatus, a position control equalizer for calculating a position signal for determining a driving amount for the optical component on the basis of the vibration signal, an internal CPU for controlling operations of the vibration control equalizer and the position control equalizer, and a control switching section for switching between the internal CPU and an external control circuit for the imaging apparatus for controlling the vibration control equalizer and the position control equalizer.

BRIEF DESCRIPTION OF THE DRAWINGS

Exemplary embodiments of the present invention will be described in detail based on the following figures, wherein.

DETAILED DESCRIPTION OF THE PREFERRED EMBODIMENT

Figure 1:
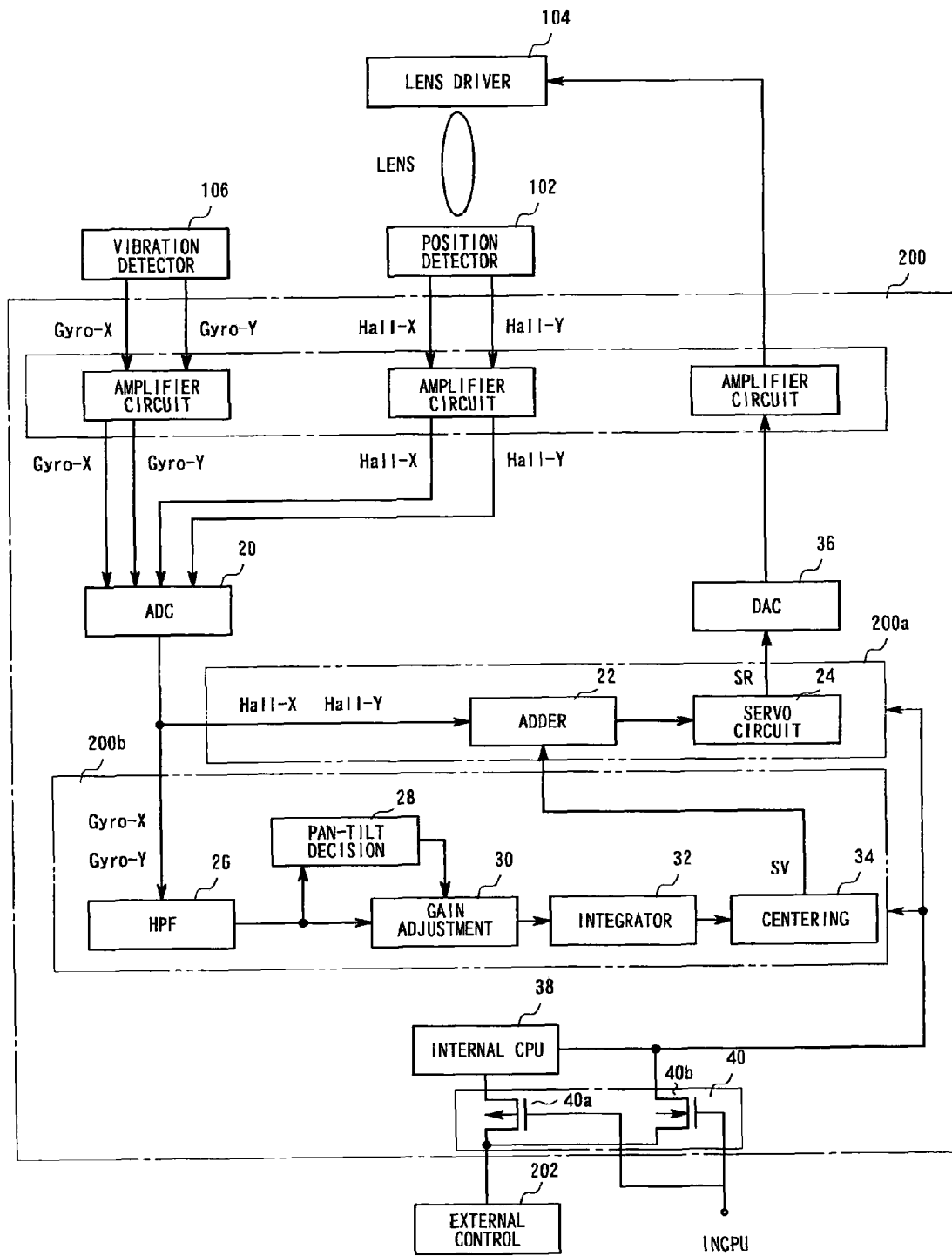
FIG. 1 shows a configuration of a image stabilization control circuit in an embodiment of the present invention.

As shown in the block diagram of FIG. 1, a image stabilization control circuit 200 in the embodiment of the present invention includes an analog-to-digital converter (ADC) 20, an adder 22, a servo circuit 24, a high-pass filter (HPF) 26, a pan-tilt decision circuit 28, a gain adjustment circuit 30, an integrator 32, a centering processing circuit 34, a digital-to-analog converter (DAC) 36, an internal CPU 38, and a control switching section 40.

The adder 22 and the servo circuit 24 form a position control equalizer 200a. Furthermore, the HPF 26, the pan-tilt decision circuit 28, the gain adjustment circuit 30, the integrator 32, and the centering processing circuit 34 form a vibration control equalizer 200b.

The image stabilization control circuit 200 is connected to the position detector 102, the lens driver 104, and the vibration detector 106. These devices are identical to those disclosed in the related art. Namely, the position detector 102 is provided with respect to at least two axes so that a position of the lens driven by the lens driver 104 can be measured so as to be at least orthogonally transformable. Furthermore, the vibration detectors 106 are provided with respect to at least two axes along the two axes of yaw and pitch so that the vibration component is orthogonally transformable.

The embodiment will be described with the position detector 102 and the vibration detector 106 installed so that the lens position and vibration can be detected in the yaw direction (X axis) and the pitch direction (Y axis) of the imaging apparatus. In the description hereinafter, addition of the X axis components and addition of the Y axis components of output signals of the position detectors 102 and the vibration detectors 106 are performed, whereupon the lens position is respectively controlled in the yaw direction (X axis) and the pitch direction (Y axis).

Moving the imaging apparatus in accordance with movement of a subject in a horizontal direction (yaw) is referred to as panning and moving in a vertical direction (pitch) is referred to as tilting.

The ADC 20 converts an analog voltage signal, which is output from the position detector 102, such as a Hall device, into a digital signal. The Hall device generates an induced current according to magnetism from a magnet, which has been fixed to the lens. Namely, the Hall device outputs a voltage signal indicating the position of the lens in accordance with a distance to the lens and the ADC 20 converts the voltage signal into a digital signal, which is output as a position signal. The ADC 20 outputs a signal indicating a reference, such as a digital signal indicating "0", when the optical axis of the lens and the center of the image sensor provided in the imaging apparatus coincide.

Furthermore, the ADC 20 converts the analog angular velocity signal output from the vibration detector 106, such as a gyro sensor, into a digital signal. Namely, the ADC 20 converts the output signals from the position detectors 102 and the vibration detectors 106 and outputs a digital signal using time-division multiplexing.

Figure 2:
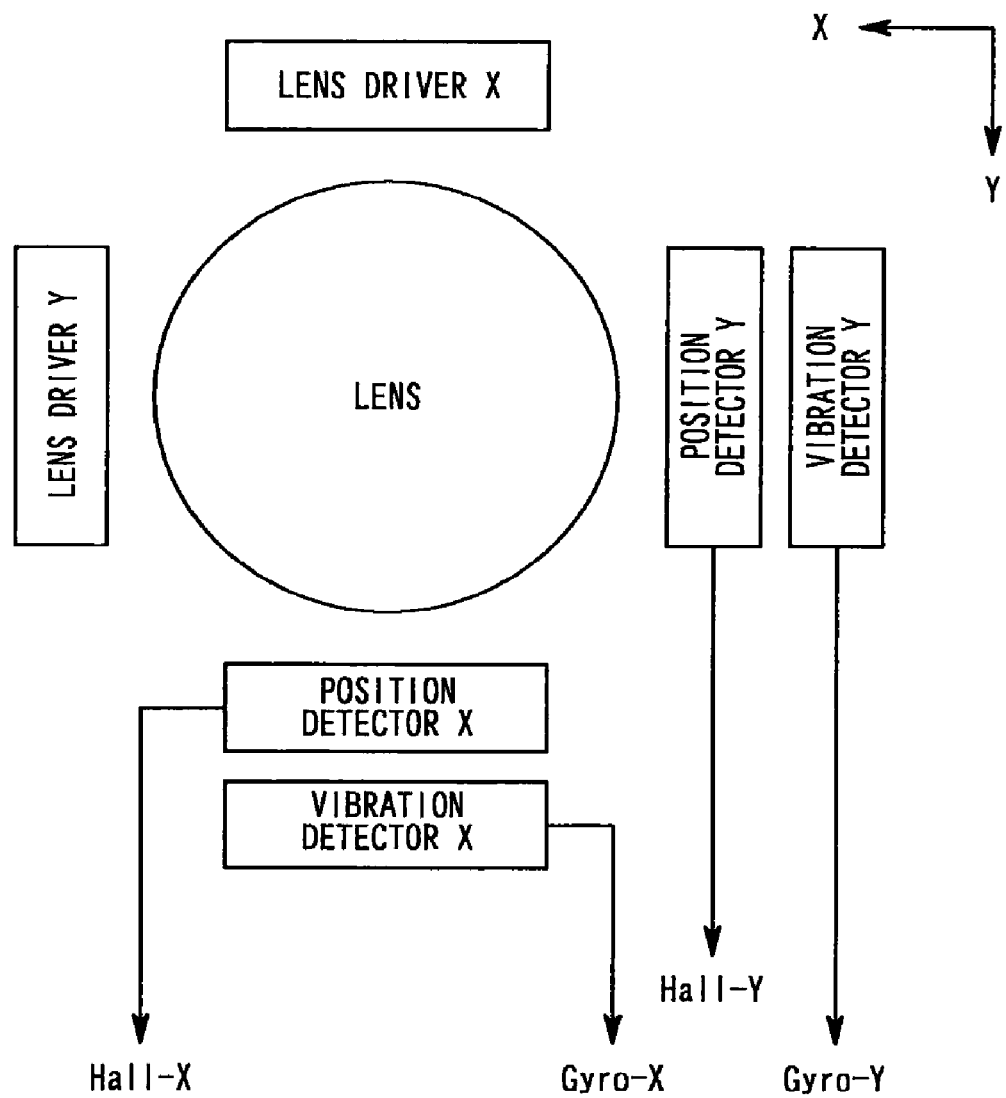
FIG. 2 shows the relative arrangement of vibration detectors and position detectors in the embodiment of the present invention.
Figure 3:
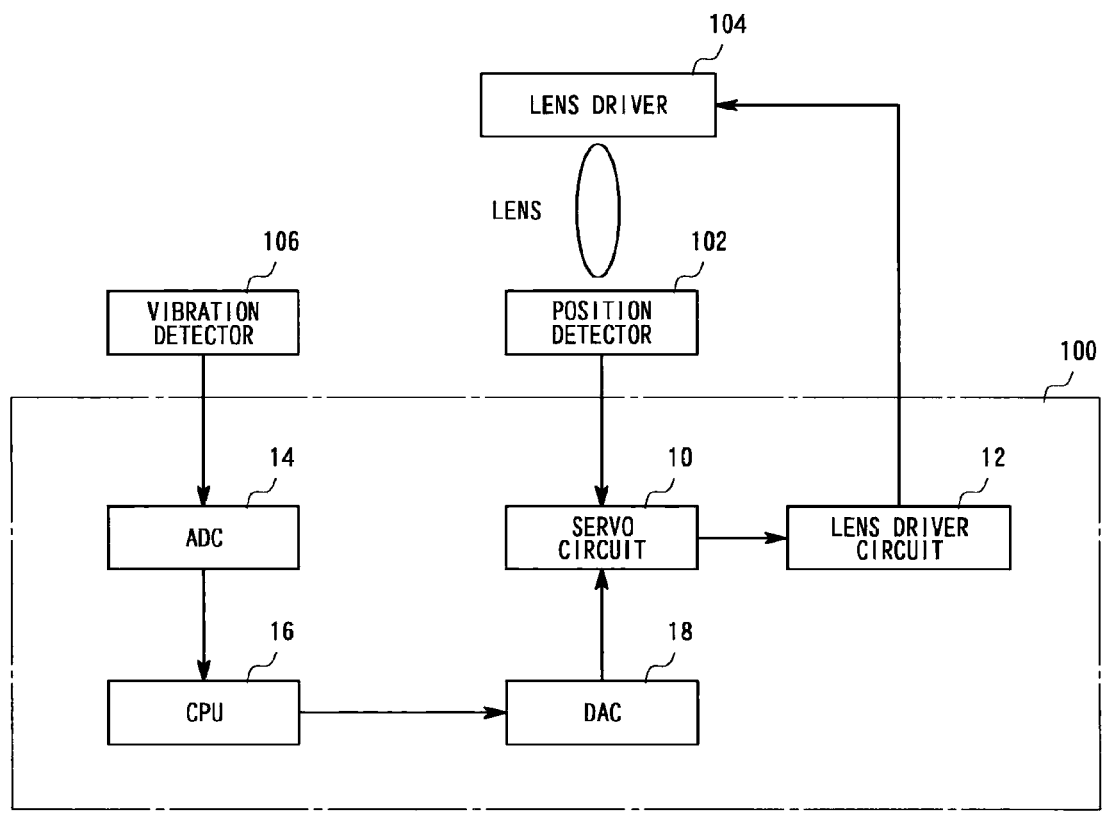
FIG. 3 shows a configuration of a image stabilization control circuit in the related art.

More specifically, as shown in FIG. 2, in the sequence of a signal (Gyro-X) for the X axis component of vibration detected by the vibration detector 106, a signal (Gyro-Y) for the Y axis component of vibration, a signal (Hall-X) for the X axis component of lens position detected by the position detector 102, and a signal (Hall-Y) for the Y axis component of lens position, the signals are converted to the digital signal and then output. The ADC 20 outputs the Gyro-X and Gyro-Y signals to the HPF 26 and the Hall-X and Hall-Y signals to the adder 22.

The HPF 26 removes a direct current component included in the angular velocity signal that is output from the vibration detector 106 and extracts a high frequency component of the angular velocity signal, which reflects the vibration of the imaging apparatus.

The pan-tilt decision circuit 28 detects pan and tilt operations of the imaging apparatus on the basis of the angular velocity signal that is output from the HPF 26. When moving the imaging apparatus, such as in accordance with movement of a subject, the vibration detector 106 outputs an angular velocity signal according to that movement. However, since variations in the angular velocity signal due to a pan operation or a tilt operation are not due to hand shake, there are instances where it is not necessary to compensate for the optical system, such as the lens. The pan-tilt decision circuit 28 is provided to realize the above-mentioned type of control. More specifically, the pan-tilt decision circuit 28 judges a present operation to be a pan or tilt operation when the angular velocity signal in a fixed period is detected to be greater than or equal to a predetermined value.

In accordance with the decision result of the pan-tilt decision circuit 28, the gain adjustment circuit 30 changes the amplification factor of the angular velocity signal that is output from the HPF 26. For example, if the present operation is not a pan or tilt operation, the gain adjustment circuit 30 performs gain adjustment to maintain the strength of the angular velocity signal that is output by the HPF 26. Furthermore, if the present operation is a pan or tilt operation, the gain adjustment circuit 30 performs gain adjustment to attenuate the strength of the angular velocity signal that is output by the HPF 26 so that the output becomes zero.

The integrator 32 integrates the angular velocity signal that is output by the gain adjustment circuit 30 and generates an angular signal indicating the movement amount of the imaging apparatus. It is preferable to configure the integrator 32 to include a digital filter (not shown) and obtain an angular signal, namely, the movement amount of the imaging apparatus, by performing filter processing in accordance with a filter coefficient that has been set into a register (not shown).

The centering processing circuit 34 subtracts a predetermined value from the angular signal that is output from the integrator 32 and generates vibration component signals (SV-X, SV-Y) indicating the movement amount of the imaging apparatus. When performing anti-shake processing in the imaging apparatus, there are instances where the position of the lens gradually separates from a reference position and approaches the limit of the movable range of the lens while compensation processing is continuously performed. At this time, if anti-shake processing is continued, the lens can move in one direction but cannot move in the other direction. The centering processing circuit 34 is provided to prevent this and performs a control operation to make it difficult to approach the limit of the movable range of the lens by subtracting the predetermined value from the angular signal.

It is preferable to configure the centering processing circuit 34 to include a digital filter (not shown) and perform subtraction of a predetermined value from the angular signal by performing filter processing according to a filter coefficient that has been set into a register (not shown).

The adder 22 adds the position signal (Hall-X) that is output from the ADC 20 and vibration component signal (SV-X) of the X axis component that is generated by the centering processing circuit 34, as well as adds the position signal (Hall-Y) that is output from the ADC 20 and the vibration component signal (SV-Y) of the Y axis component that is generated by the centering processing circuit 34 and outputs to the servo circuit 24.

The servo circuit 24 generates a compensation signal SR for controlling the drive of the lens driver 104 in accordance with the output signal from the adder 22. The servo circuit 24 includes a register and a digital filter circuit and performs filter processing using a filter coefficient stored in the register.

The DAC 36 converts the digital compensation signal SR to an analog signal. On the basis of the compensation signal SR that was converted to analog by the DAC 36, the lens of the imaging apparatus is driven along the X axis and the Y axis by the lens driver 104.

The internal CPU 38 is mounted in the image stabilization control circuit 200. The internal CPU 38 is used for setting coefficients of various filters included in the image stabilization control circuit 200 and control parameters of the servo circuit 24. Furthermore, additional processing considered necessary by the image stabilization control circuit 200 may be performed by the internal CPU 38.

Furthermore, the image stabilization control circuit 200 in the embodiment includes the control switching section 40 for controlling the switching between the internal CPU 38 and an external control circuit (control device) 202. An example of the external control circuit is a main control device (main CPU) for controlling the overall imaging apparatus, such as a digital camera, and performing image processing.

More specifically, the control switching section 40 can be configured to include field-effect transistors as shown in FIG. 1. In the embodiment, a drain and a source of a p-channel MOSFET 40a connect the external control circuit 202 to the internal CPU 38, and a drain and a source of an n-channel MOSFET 40b connect the external control circuit 202 to the position control equalizer 200a and the vibration control equalizer 200b. Furthermore, a gate of the p-channel MOSFET 40a and a gate of the n-channel MOSFET 40b are connected to a common external control terminal INCPU.

To simplify the drawing, the connection between the external control circuit 202 and the internal CPU 38 or the connection between the external control circuit 202 and the position control equalizer 200a and the vibration control equalizer 200b is respectively indicated by a singular line. However, if the connections use multiple lines, the respective lines may be connected in a similar manner with the p-channel MOSFET 40a or the n-channel MOSFET 40b.

When the external control terminal INCPU is set to a low level, the p-channel MOSFET 40a enters a conduction state between the drain and source and the n-channel MOSFET 40b enters a non-conduction state between the drain and source. As a result, the external control circuit 202 connects to the internal CPU 38, and the external control circuit 202 disconnects from the position control equalizer 200a and the vibration control equalizer 200b. In this state, the internal CPU 38 directly controls the position control equalizer 200a and the vibration control equalizer 200b.

In this state, the coefficients of various filters included in the position control equalizer 200a and the vibration control equalizer 200b and the control parameters of the servo circuit 24 can be set by the internal CPU 38. In this case, it is not necessary to prepare firmware in the external control circuit 202 for controlling the image stabilization control circuit 200 and the vibration control processing can be realized with a standalone chip for the image stabilization control circuit 200. Of course, the position control equalizer 200a and the vibration control equalizer 200b can also be controlled indirectly from the external control circuit 202 via the internal CPU 38.

On the other hand, when the external control terminal INCPU is set to a high level, the p-channel MOSFET 40a enters a non-conduction state between the drain and source and the n-channel MOSFET 40b enters a conduction state between the drain and source. As a result, the external control circuit 202 disconnects from the internal CPU 38, and the external control circuit 202 connects to the position control equalizer 200a and the vibration control equalizer 200b. In this state, the external control circuit 202 directly controls the position control equalizer 200a and the vibration control equalizer 200b.

In this state, the coefficients of the various filters included in the position control equalizer 200a and the vibration control equalizer 200b and the control parameters of the servo circuit 24 can be directly set by the external control circuit 202. In this case, although it is necessary to prepare firmware in the external control circuit 202 for controlling the image stabilization control circuit 200, integrated processing for the overall imaging apparatus, such as vibration control processing combined with other image processing, can be realized.

The external control terminal INCPU may be controlled by an external control circuit.

Movement control of the lens for compensating for shaking of a subject due to hand shake will be described using the image stabilization control circuit 200 shown in FIG. 1.

First, a case will be described where there is no shaking of the subject due to hand shake. Since the lens driven by the lens driver 104 is positioned so that its optical axis and the center of the image sensor provided in the imaging apparatus coincide, the ADC 20 outputs digital position signals (Hall-X, Hall-Y) indicating "0". When the values of the position signals (Hall-X, Hall-Y) indicate "0", the servo circuit 24 outputs the compensation signal SR for controlling the lens driver 104 so as to maintain the present lens position.

Furthermore, if the lens position and the center of the image sensor do not coincide, the ADC 20 outputs digital position signals (Hall-X, Hall-Y) indicating non-zero values. In accordance with the output values of the ADC 20, the servo circuit 24 outputs the compensation signal SR for controlling the lens driver 104 so that the values of the position signals (Hall-X, Hall-Y) become "0". Repeating the above-mentioned operations controls the lens position so that the lens position and the center of the image sensor coincide.

Next, a case will be described where shaking of the subject occurs due to hand shake. Since the lens driven by the lens driver 104 is positioned so that its optical axis and the center of the image sensor provided in the imaging apparatus coincide, the ADC 20 outputs digital position signals (Hall-X, Hall-Y) indicating "0". On the other hand, since the imaging apparatus moves due to hand shake, the integrator 32 and the centering processing circuit 34 output vibration component signals (SV-X, SV-Y) indicating the movement amount of the imaging apparatus.

The servo circuit 24 generates the compensation signal SR in accordance with a signal in which the position signal s (Hall-X) indicating "0", which is output by the ADC 20, and the vibration component signal (SV-X), which is output by the centering processing circuit 34, have been added. At this time, since the vibration component signal (SV-X), which is not "0", has been added regardless of the position signal (Hall-X) being "0", the servo circuit 24 generates the compensation signal SR for moving the lens. The lens driver 104 for the X axis is controlled in accordance with this compensation signal SR. Similarly, the compensation signal SR is generated in accordance with a signal in which the position signal (Hall-Y) indicating "0", which is output by the ADC 20, and the vibration component signal (SV-Y), which is output by the centering processing circuit 34, have been added. At this time, since the vibration component signal (SV-Y), which is not "0", has been added regardless of the position signal (Hall-Y) being "0", the servo circuit 24 generates the compensation signal SR for moving the lens. The lens driver 104 for the Y axis is controlled in accordance with this compensation signal SR. Since the lens driver 104 moves the lens on the basis of the compensation signals SR output by the servo circuit 24, the image sensor provided in the imaging apparatus can obtain a signal in which shaking of the subject due to hand shake is suppressed. By repeating this control operation, the image stabilization control circuit 200 realizes anti-shake control.

Furthermore, by configuring the image stabilization control circuit 200 to include the HPF 26, the integrator 32, and the centering processing circuit 34 in the embodiment of the present invention, the circuit area can be reduced in comparison to a configuration where the above-mentioned processing is performed by the internal CPU 38. Thus, the cost of the semiconductor chips on which the image stabilization control circuit 200 is mounted can be lowered.

Furthermore, by providing the control switching section 40, the control of the image stabilization control circuit 200 can be switched to either the internal CPU 38 or the external controls circuit 202. In this manner, embedding a major part of the processing of the image stabilization control circuit 200 as logic circuits of the position control equalizer 200a and the vibration control equalizer 200b contributes to enabling control by the external control circuit 202. Namely, this is because the control load of the image stabilization control circuit 200 can be lightened by the conversion to logic circuits and the load when performing control of the image stabilization control circuit 200 from the external control circuit 202, which also handles other processing, can be lightened.

Although the position detector 102, the lens driver 104, and the vibration detector 106 respectively adopted a Hall device, a voice coil motor, and a gyro sensor in the embodiment of the present invention, the present application is not limited thereto. For example, the lens driver 104 can utilize a piezoelectric device. Furthermore, the vibration detector 106 can utilize a sensor for detecting acceleration in a linear direction and can be configured for detecting vibration of the imaging apparatus on the basis of an acceleration signal.

Moreover, although a lens shift method is adopted in the embodiment of the present invention for performing anti-shake processing by driving the lens, the present invention is not limited thereto. For example, the present invention can be applied to a CCD shift method for shifting an image sensor, such as a CCD, in accordance with shaking of the imaging apparatus. At this time, the position detector 102 detects the position of the image sensor and the lens driver 104 can be the device for driving the image sensor.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A image stabilization control circuit for reducing influence on image pickup from vibration by driving an optical component of an imaging apparatus according to the vibration, comprising:
    a vibration control equalizer for processing an output signal of a vibration detector for detecting vibration of the imaging apparatus and generating a vibration signal indicating a movement amount of the imaging apparatus on the basis of vibration of the imaging apparatus;
    a position control equalizer for calculating a position signal for determining a driving amount for the optical component on the basis of the vibration signal;
    an internal CPU for controlling operations of the vibration control equalizer and the position control equalizer; and
    a control switching section for switching between the internal CPU and an external control circuit for the imaging apparatus for controlling the vibration control equalizer and the position control equalizer.

2. An image stabilization control circuit according to claim 1, wherein:
    the control switching section comprises a switching device for switching, based on a signal applied to an external control terminal, between the internal CPU and the external control circuit, for control of the vibration control equalizer and the position control equalizer.

3. An image stabilization control circuit according to claim 2, wherein:
    the external control terminal is controlled by the external control circuit.

4. An image stabilization control circuit according to claim 1, wherein:
    the position control equalizer processes an output signal of a position detector, which detects a position of the optical component, and calculates a position signal for determining a driving amount for the optical component on the basis of the vibration signal and a position of the optical component.

* * * * *